(12) United States Patent
Eckard et al.

(10) Patent No.: US 9,670,806 B2
(45) Date of Patent: Jun. 6, 2017

(54) TURBO PCV VALVE

(71) Applicant: MINIATURE PRECISION COMPONENTS, INC., Walworth, WI (US)

(72) Inventors: Duane M. Eckard, Loves Park, IL (US); James J. Mosher, Milton, WI (US); Brian P. Schuessler, Lake Geneva, WI (US); Thomas A. Everts, Clinton, WI (US)

(73) Assignee: MINIATURE PRECISION COMPONENTS, INC., Walworth, WI (US)

( * ) Notice: Subject to any disclaimer, the term of this patent is extended or adjusted under 35 U.S.C. 154(b) by 463 days.

(21) Appl. No.: 14/020,826

(22) Filed: Sep. 7, 2013

(65) Prior Publication Data

US 2014/0069399 A1   Mar. 13, 2014

Related U.S. Application Data (60) Provisional application No. 61/698,207, filed on Sep. 7, 2012.

(51) Int. Cl.
*F02B 25/06* (2006.01)
*F01M 13/00* (2006.01)
*G05D 7/01* (2006.01)

(52) U.S. Cl.
CPC ......... *F01M 13/0011* (2013.01); *G05D 7/014* (2013.01); *G05D 7/0133* (2013.01); *Y10T 137/776* (2015.04)

(58) Field of Classification Search
CPC .. E21B 43/123; F02D 9/1055; F01M 13/0011
USPC .............. 123/574, 572; 137/572, 516.27
See application file for complete search history.

(56) References Cited

U.S. PATENT DOCUMENTS

| | | | | |
|---|---|---|---|---|
| 3,359,960 | A * | 12/1967 | Pittsley | F01M 13/023 123/574 |
| 3,766,898 | A * | 10/1973 | McMullen | F01M 13/023 123/574 |
| 4,056,085 | A * | 11/1977 | Nowroski | F01M 13/023 123/574 |
| 5,947,171 | A * | 9/1999 | Woodruff | B65D 23/102 141/346 |
| 6,546,921 | B1 * | 4/2003 | Callahan | F01M 13/0011 123/573 |
| 6,575,022 | B1 * | 6/2003 | Schneider | F01M 13/00 73/114.01 |
| 6,807,958 | B2 * | 10/2004 | Kabat | F01M 13/023 123/574 |
| 7,422,612 | B2 * | 9/2008 | Pietschner | F01M 13/04 123/573 |
| 2008/0035221 | A1 * | 2/2008 | Gawryjolek | F16K 1/305 137/613 |

(Continued)

*Primary Examiner* — Marguerite McMahon
*Assistant Examiner* — James Kim
(74) *Attorney, Agent, or Firm* — Dickinson Wright PLLC (57) ABSTRACT

A PCV valve that also monitors the flow of gases produced by use of a turbocharger. A spring biased plunger member is used to restrict and meter the flow of gases through the PCV valve. A nozzle member with a Venturi throat is used to allow back flow caused by use of a turbocharger. The nozzle member can be part of a module including a passageway member that can be closed by the plunger member.

32 Claims, 5 Drawing Sheets

(56) References Cited

U.S. PATENT DOCUMENTS

2009/0205123 A1* 8/2009 Forrest ................. A47K 17/022
 4/576.1
2009/0223498 A1* 9/2009 Shieh .................... F02M 25/06
 123/574

* cited by examiner

TURBO PCV VALVE

CROSS-REFERENCE TO RELATED APPLICATION

This application claims the benefit of U.S. Provisional Application Ser. No. 61/698,207, filed Sep. 7, 2012, which is incorporated herein by reference in its entirety.

TECHNICAL FIELD

The present invention relates to PCV valves, particularly for use with engines with turbochargers.

BACKGROUND OF THE INVENTION

The Positive Crankcase Ventilation (PCV) valve is a part of the PCV system where the engine passes harmful crankcase combustion gases to the air intake. Instead of venting the crankcase gases to the atmosphere, they are fed into the intake manifold where they can be re-entered into the engine combustion chambers as part of the air/fuel mixture and burned. This results in lower pollution and extended engine oil life. PCV valves act as both a crankcase ventilation system and as a pollution control device.

The PCV valve performs a complicated, but necessary, control function and can act to restrict the amount of air passing through it. When the engine is running under light loads, the intake manifold air pressure is less than the crankcase air pressure. Under these conditions, the crankcase gases are drawn through the PCV valve and into the intake manifold.

At idle, the intake manifold vacuum is near maximum. This results in the least amount of blow-by and the PCV valve provides the largest amount of restriction. As engine load increases, vacuum on the valve decreases proportionally and blow-by increases proportionally. At a low level of vacuum, the PCV valve allows more air flow.

When the engine is running at wide open throttle, the manifold pressure is about the same level as the engine crankcase, and the function of the PCV valve is minimal. When the manifold pressure is considerably higher than that of the crankcase, the PCV valve is closed to prevent reversal of the exhausted gases back into the crankcase.

The operation of a turbocharger in a turbocharged engine is similar to that of an engine running at wide open throttle. During boost from a turbocharger, additional pressure is built up that needs to be relieved.

It is an object of the present invention to provide an improved PCV valve for use in engine systems which have turbochargers.

SUMMARY OF THE INVENTION

The present invention provides a PCV valve with a tubular-shaped outer housing, a spring biased plunger member and two passageways for passage of gases. In accordance with a preferred embodiment of the invention, the plunger has a tapering narrow end which is positioned in an annular washer. As the plunger moves longitudinally in the housing, it acts as a restrictor valve to regulate the amount of crankcase combustion air which can pass to the intake manifold.

Also in accordance with a preferred embodiment of the invention, a first passageway member is positioned below the plunger. The lower end of the plunger is positioned to close the first passageway when the pressures of the crankcase and manifold are approximately equal. A second passageway is positioned adjacent the first passageway and preferably has an internal Venturi nozzle. An orifice can also be used depending on the flow curve desired. The second passageway allows air flow due to the turbocharger to pass through the housing in a controlled manner.

Additional features and benefits of the present invention will become apparent from the following description of the preferred embodiment of the invention when viewed in accordance with the attached drawings and appended claims.

DESCRIPTION OF PREFERRED EMBODIMENTS

Figures 1, 2, 2A, 4:
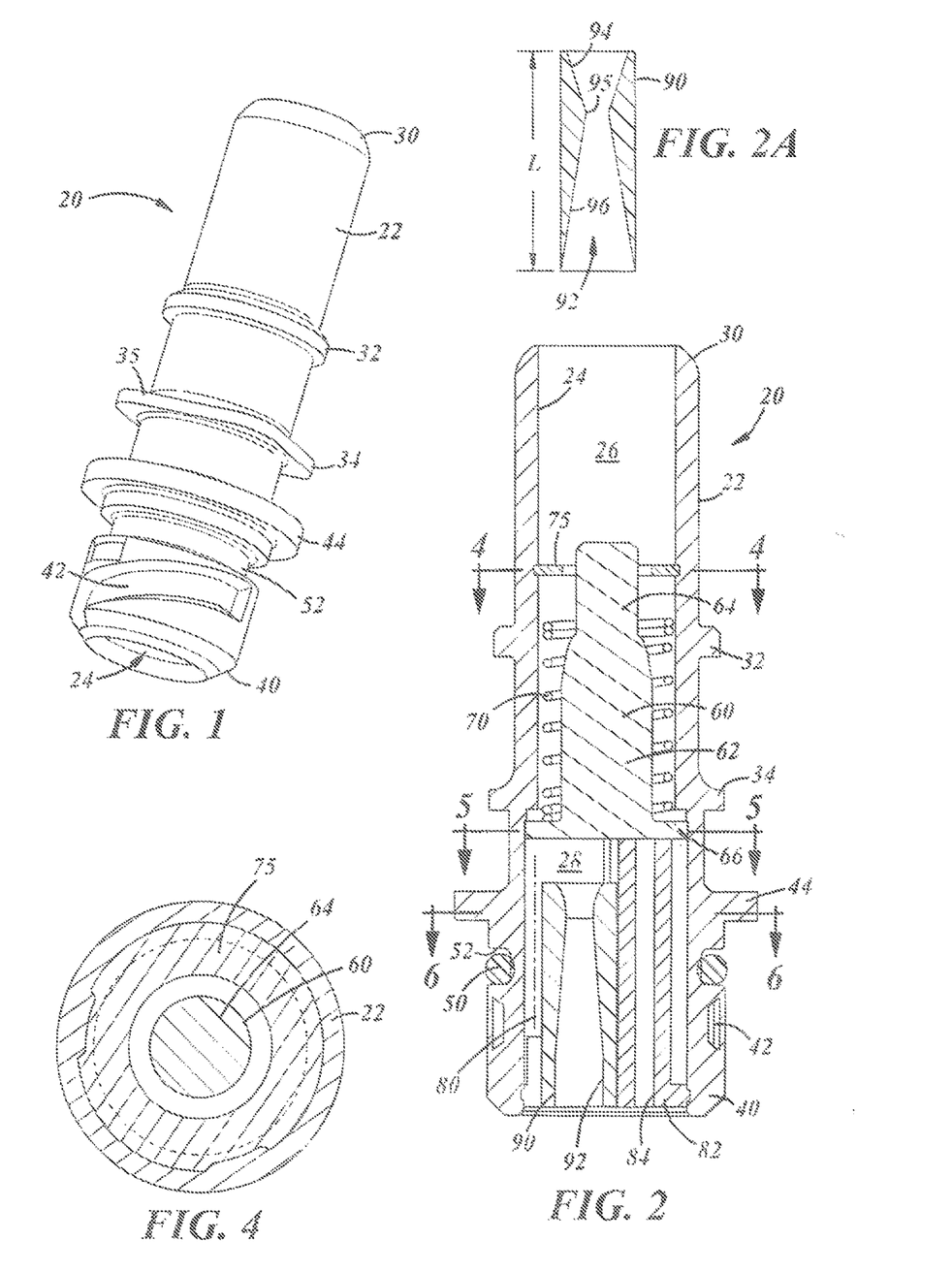
FIG. 1 is a perspective view of a PCV valve in accordance with a preferred embodiment of the invention.
FIG. 2 is a cross-section of the PCV valve in FIG. 1.
FIG. 2A depicts an enlarged view of the nozzle member as shown in FIG. 2.
FIG. 4 is a cross-sectional view taken along lines 4-4 in FIG. 2.

FIGS. 1 and 2 depict a preferred embodiment 20 of the PCV valve invention. FIG. 1 is a perspective view highlighting the tubular shape of the PCV housing member 22. FIG. 2 is a cross-sectional view of the PCV valve 20. The housing member 22 is preferably made of plastic in two or more sections, and preferably made by injection molding. The housing 22 has a central elongated cavity or passageway 24. The cavity has a first section 26 and a second section 28. The second section 28 has a larger diameter than the first section 26 for a reason that will become apparent from the description below.

The housing member 22 has a first end 30 which is adapted to be connected to a tube or the like (not shown) for passage of crankcase combustion gases to an intake manifold. For purpose of securely connecting or attaching the housing member at the first end 30 to a tube or the like, a pair of annular flanges 32 and 34 can be provided. It is to be understood, however, that any other conventional ways of connecting or attaching the PCV housing to a manifold can be utilized.

The housing member 22 also has a second end 40 which is adapted to be connected to the crankcase or to another member which is associated with the crankcase or engine. The second end 40 as shown in the drawings is provided with a cam-twist structure 42 for secure connection to a conventional crankcase cover member (not shown).

The second end 40 also has a third annular flange member 44 which is used to assist in securely attaching the PCV valve to the crankcase or other accessory. An O-ring 50 is also positioned in annular groove 52 adjacent the second end 40 in order to seal the attachment of the PCV valve to the crankcase or crankcase cover.

In order to assist in securely attaching the PCV valve in place, one or more of the annular flanges can have flattened areas for mating with a wrench or other tool. In the drawings, flange member 34 is depicted as having such flat areas 35 for that purpose.

Figures 3, 5, 6:
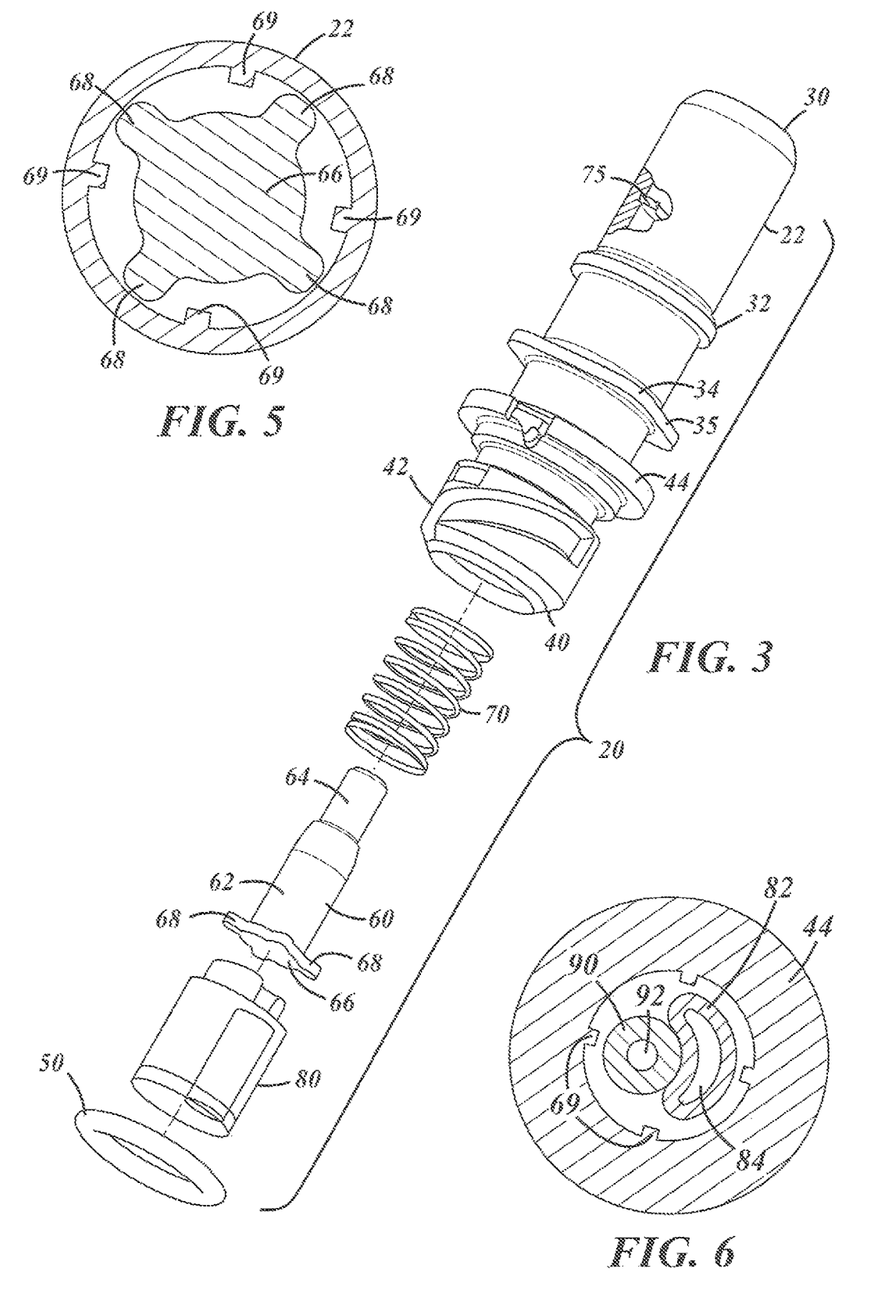
FIG. 3 is an expedited view of the components of the PCV valve of FIG. 2.
FIG. 5 is a cross-sectional view taken along lines 5-5 in FIG. 2.
FIG. 6 is a cross-sectional view taken along lines 6-6 in FIG. 2.

As shown in the Figures, particularly FIG. 3, the PCV valve includes a housing member 22, a plunger member 60, a spring member 70, a washer member 75, an O-ring member 50, and a co-passageway module 80. These components are also shown in one or more of FIGS. 2 and 4-10 and indicated by the same reference numerals.

The plunger member 60 is preferably made of a metal material, such as cold formed steel, although the plunger member could be made of a plastic material or any other material that would accomplish the same purpose and operation. The member 60 has a body portion 62, a narrower end portion 64 and a lower flange or base member 66. The narrow end portion 64 is provided to fit within the center opening of washer member 75.

It is also to be understood that the form and shape of the plunger and spring assembly shown in the drawings is merely exemplary. There are numerous plunger and spring assemblies for PCV valves known in the art, such as ball and spring mechanisms, which can be used in the present invention.

The washer member 75 is preferably any standard metal washer and is fixedly attached in the sidewall of the housing member 22 in the cavity 26. Preferably, the washer member 75 is insert molded in the housing when the housing is injection molded. It should be noted that the washer could also be made from plastic or other material that fits the function.

The spring member 70 is preferably a metal coil spring as shown in the drawings, but can be any type of biasing member that would accomplish the same purpose and reach the same results.

The base member 66 on the plunger member 60 has a plurality of tab members 68, as particularly shown in FIGS. 3 and 5. The diameter of the base member is also preferably larger than the diameter of the body member 62, although this is not critical. The base member can also be circular or square or any other shape as desired. The tab members 68 are used as a stop for the spring member 70, and also assist in keeping the plunger member 60 centered in the housing cavity. This allows uniform flow of gases around the plunger member 60 and through and around the spring member 70.

Also, as shown in FIG. 5, one or more elongated ridge members 69 are provided inside the housing. These ribs secure the molded in washer more steadfastly, and ensure that the washer stays in location. The ribs also prevent the plunger member 60 from rotating in the housing. Although four tab members 68 and four ridge members 69 are shown, the number is not critical. More or less than four tab members and ridge members 69 can be provided.

The co-passageway module 80 is preferably a plastic molded member that is inserted and positioned in cavity section 28 in the lower end 40 of the housing member 22. Preferably the module is press-fit in the end 40 of the housing 22. The module 80 has a cylindrical outer shell member and a pair of upstanding passageway members positioned or integrally formed within it. The co-passageway module 80 includes a first passageway member 82. The first passageway member 82 is a hollow tubular member having a central channel or passageway 84 which extends the entire length thereof. The passageway member 82 can be any cross-sectional shape, such as the arcuate shape shown in FIG. 6.

Figure 7:
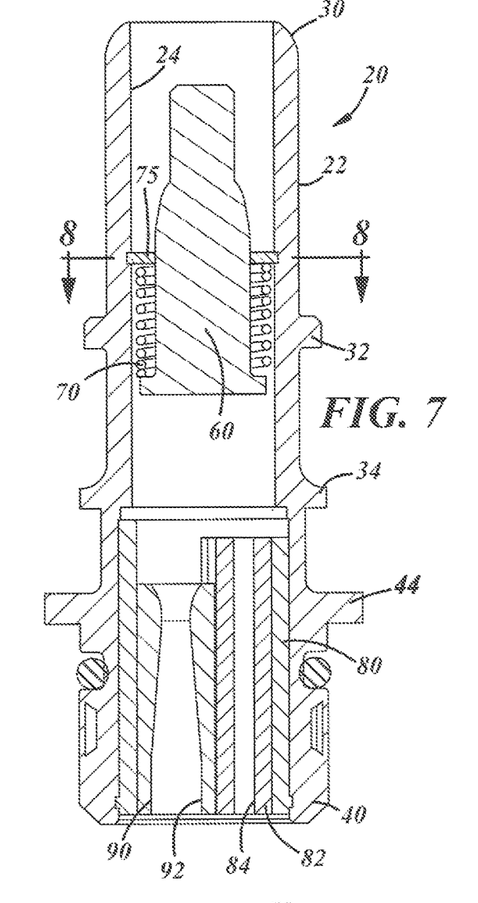
FIG. 7 is another cross-sectional view of a preferred embodiment of the invention when in operation.
Figure 8:
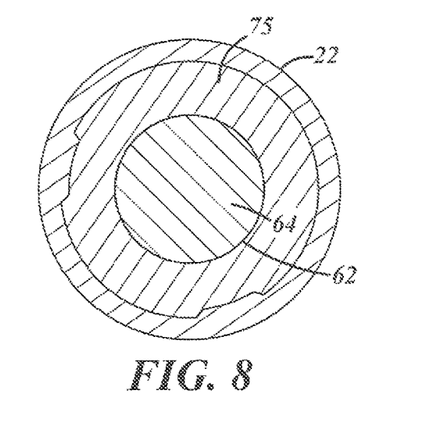
FIG. 8 is a cross-sectional view taken along lines 8-8 in FIG. 7.

The second passageway member, also referred to as nozzle member 90, similarly has a central channel or passageway 92. In the cross-section of member 90, as shown in FIGS. 2, 2A and 7, the channel 92 is a Venturi-type nozzle. The nozzle or passageway 92 has a radius-shaped inlet end 94, a throat area 95 and a cone-shaped exit end 96.

The nozzle member 90 has a length L as shown in FIG. 2A. The radius-shaped end 94 is less than 50% of the length L, and preferably about 25%. Gases passing through the nozzle member are increased in velocity in the inlet end as they pass through the throat area 95. The velocity of the gases decreases in the cone-shaped exit end 96, preferably to a velocity and pressure substantially the same as the velocity and pressure that the gases had when they entered the inlet end 94.

The nozzle 92 with the throat area acts as a flow restrictor with a controlled response and reinstates the velocity of the gases passing through it without a significant pressure loss.

The nozzle member 90 is shorter in length than the passageway member 82, such that the plunger member cannot seat on it and block passage of gases through it. The structure of the nozzle passage in the nozzle member 90 also prevents or minimizes any differential in pressure between one end or the other as gases pass through it. The nozzle controls engine bypass gases when the function of the turbocharger increases in magnitude. When the engine runs in normally aspirated mode, the nozzle provides minimal function. In some situations, it may be necessary to utilize a flow control orifice in place of a nozzle. In those cases, the internal dimensions will change accordingly.

Figure 12:
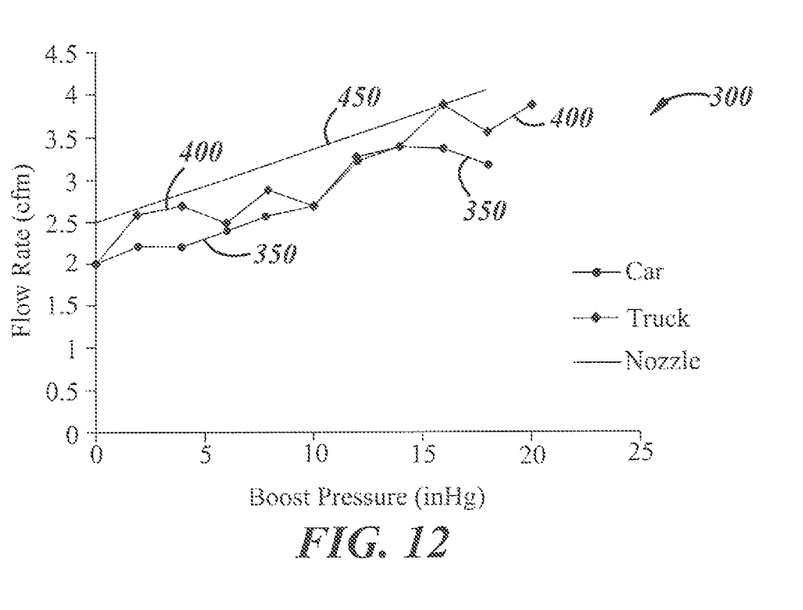
FIG. 12 is a graph depicting flow rates.

The size of the flow nozzle member 90 is selected depending on the blowby data and flow curve utilized for the vehicle or vehicles with which the PCV valve will be used. A graph 300 depicting blowby flow curve data for representative vehicles is shown in FIG. 12. The flow curve relative to cars is shown by line 350, and the flow curve relative to trucks is shown by line 400. The reverse flow required for the nozzle member 90 is shown by line 450. Based on this data and shape of the flow curves, a flow nozzle with a throat size of 0.087 inches would meet the flow requirement.

It is also possible in an alternate embodiment to provide a module with a nozzle member and an opening in a plate member adjacent the plunger member, such that the plunger member can cover and seal the opening in the plate member.

The basic operation of the biased plunger member and washer are similar to conventional PCV valves. The PCV valve 20 acts to restrict and meter the flow of gases passing through it. When the pressure of the crankcase gases are more than the pressures of the gases at the intake manifold, a vacuum is created which moves the plunger toward the inlet end 30 of the housing. With a significant difference in the pressures, the plunger compresses the spring member against the washer member and restricts and limits the amount of the gases which can pass through the valve. This prevents too much air being added to the intake manifold and causing the fuel/air mixture to be too lean.

Figure 9:
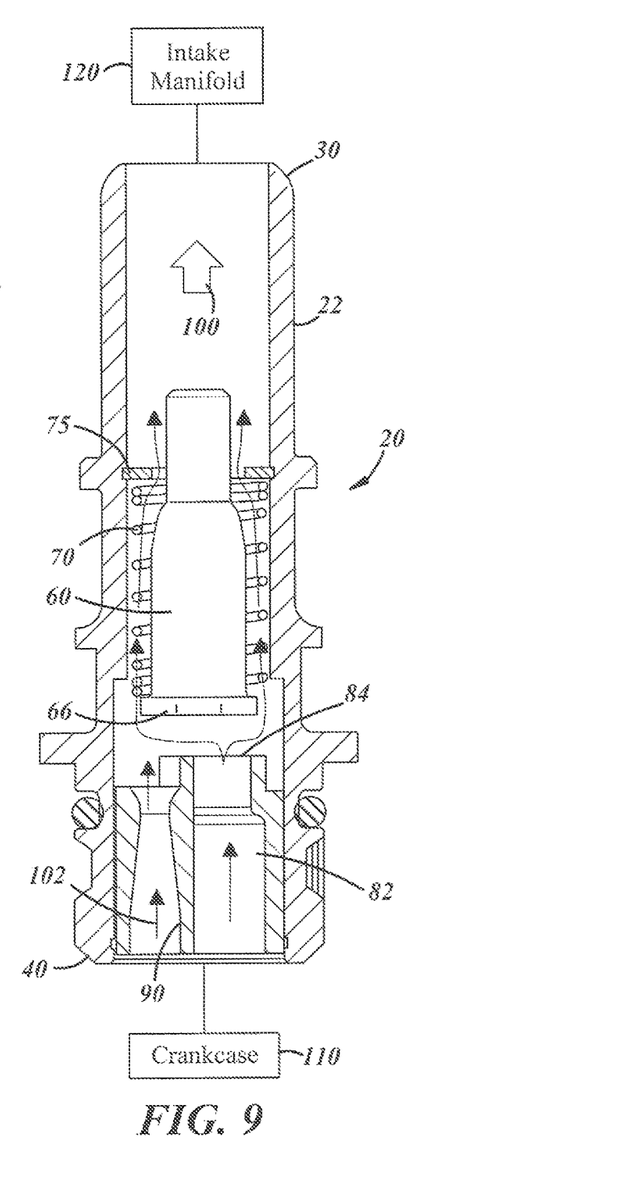
FIGS. 9 and 10 are additional cross-sectional views of an embodiment of the invention in different operational situations.
Figure 10:
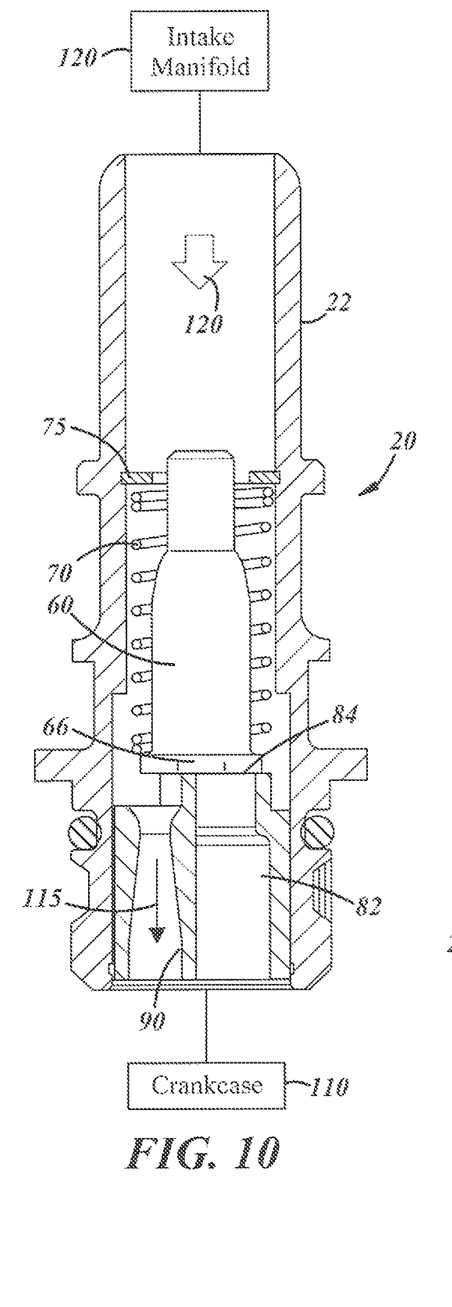

FIGS. 9 and 10 depict two different points in time in the operation of the disclosed embodiment of the invention. In FIG. 9, the plunger member 60 has been moved in the direction of the arrow 100 due to the differential difference in pressure between the crankcase 110 and the intake manifold 120. The higher pressure in the crankcase has pushed the plunger against the bias of the spring member toward the intake manifold. This also opens the channel 82 in the passageway member 82 by moving the base 66 of the plunger member away from the opening 84. In this condition, all of the passage of gases through the PCV valve are in the direction of the arrow 100.

As indicated by arrow 102 in FIG. 9, some of the gases may also be passing through the passage in the nozzle member 90. These will be in the same direction as arrow 100.

In FIG. 10, the pressure differential between the crankcase and intake manifold is minimal or non-existent. As such, the plunger member 60 is positioned (or seated) firmly on the end of the passageway member 82 and blocking the channel 84. Under this condition, a backflow of gas can flow back through the PCV valve when the turbocharger is operating, or when there is a boost of air from the turbocharger. In this situation, the passage of gases flow through the nozzle member 90, as shown by arrow 115.

Figure 11:
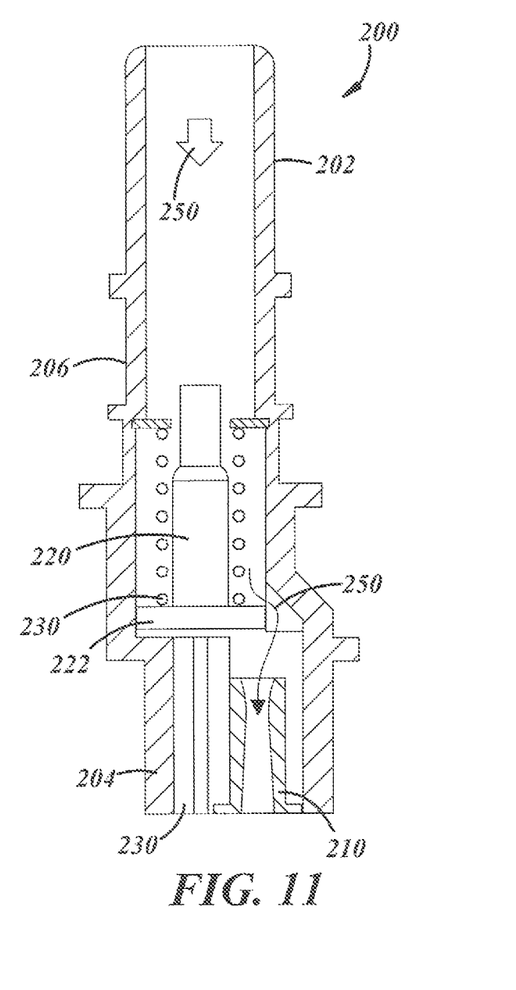
FIG. 11 depicts another embodiment of the invention.

FIG. 11 depicts an alternate PCV embodiment 200 in accordance with the invention. In this embodiment, the housing member 202 has an auxiliary housing member 204 added on the end of the tubular member 206. The auxiliary housing member 204 houses a nozzle member 210 which is the same as the nozzle member 90 described above.

The plunger member 220 and its operation are the same as that of plunger member 60 described above. A biasing spring member 230 assists in the operation of the plunger member. The base 222 of the plunger member seats on the open end of passageway member 230, which preferably is substantially the same as passageway member 82 described above.

The airflow around the plunger member caused by operation of a turbocharger is indicated by arrow 250.

While preferred embodiments of the present invention have been shown and described herein, numerous variations and alternative embodiments will occur to those skilled in the art. Accordingly, it is intended that the invention is not limited to the preferred embodiments described herein but instead limited to the terms of the appended claims.

What is claimed is:

1. A valve comprising:
   a housing member having an elongated cavity;
   a plunger member positioned in said cavity, said plunger member adapted to move longitudinally in said cavity in both a first and second direction;
   a spring member for biasing said plunger member when moved in said first direction;
   a first passageway member positioned in said cavity below said plunger member, said first passageway member having a first passageway; and
   a nozzle member positioned in said cavity below said plunger member, said nozzle member having a second passageway, said second passageway having a narrow throat;
   wherein movement of said plunger member in said second direction, toward said first passageway member and said nozzle member, seals off said first passageway against gas flow with said nozzle member remaining below said plunger member and open to gas flow.

2. The valve as described in claim 1 wherein said plunger member comprises a plurality of tab members.

3. The valve as described in claim 2 wherein said housing member has at least one elongated rib member in said cavity, wherein rotation of said plunger member is restricted.

4. The valve as described in claim 1 wherein said first passageway member and said nozzle member are included in a modular member which is positioned in said cavity.

5. The valve as described in claim 4 wherein said modular member is press-fit in said cavity.

6. The valve as described in claim 1 further comprising a washer member in said cavity.

7. The valve as described in claim 6 wherein said washer member is insert molded in said housing.

8. The valve as described in claim 1 wherein said throat of said nozzle member is positioned adjacent one end of said second passageway.

9. The valve as described in claim 8 wherein said one end of said second passageway is positioned adjacent said plunger member.

10. The valve as described in claim 8 wherein said throat is positioned less than 50% of the length of said second passageway.

11. The valve as described in claim 10 wherein said throat is positioned about 25% of the length of said second passageway.

12. The valve as described in claim 1 wherein said plunger member has a base member thereon.

13. The valve as described in claim 12 further comprising a plurality of tab members on said base member.

14. The valve as described in claim 13 wherein said housing member has at least one elongated rib member in said cavity, wherein rotation of said plunger member is restricted.

15. The valve as described in claim 1 wherein said first passageway member and said nozzle member are positioned adjacent one another in said cavity.

16. The valve as described in claim 13 wherein said nozzle member is shorter in length than said first passageway member, wherein when the plunger member is sealed on said first passageway member, flow can pass through said nozzle member.

17. The valve as described in claim 1 wherein the size of the throat in said nozzle member is determined from blowby data.

18. A valve comprising:
   a housing member having an elongated cavity;
   a plunger member positioned in said cavity, said plunger member adapted to move longitudinally in said cavity in both a first and second direction;
   a spring member for biasing said plunger member when moved longitudinally in said housing in said first direction;
   an opening in said cavity below said plunger member; and
   a nozzle member positioned in said cavity below said plunger member, said nozzle member having a passageway with a throat;
   wherein movement of said plunger member longitudinally in said second direction, toward said opening and said nozzle member, seals off said opening against gas flow with said nozzle member remaining below said plunger member and open to gas flow.

19. The valve as described in claim 18 wherein said plunger member comprises a plurality of tab members.

20. The valve as described in claim 19 wherein said housing member has at least one elongated rib member in said cavity, wherein rotation of said plunger member is restricted.

21. The valve as described in claim 18 wherein said nozzle member is included in a modular member is positioned in said cavity.

22. The valve as described in claim 21 wherein said modular member is press-fit in said cavity.

23. The valve as described in claim 18 further comprising a washer member in said cavity.

24. The valve as described in claim 23 wherein said washer member is insert molded in said housing.

25. The valve as described in claim 18 wherein said throat of said nozzle member is positioned adjacent one end of said passageway.

26. The valve as described in claim 25 wherein said one end of said nozzle passageway is positioned adjacent said plunger member.

27. The valve as described in claim 26 wherein said throat is positioned less than 50% of the length of said nozzle passageway.

28. The valve as described in claim 27 wherein said throat is positioned about 25% of the length of said nozzle passageway.

29. The valve as described in claim 18 wherein said plunger member has a base member thereon.

30. The valve as described in claim 29 further comprising a plurality of tab members on said base member.

31. The valve as described in claim 30 wherein said housing member has at least one elongated rib member in said cavity, wherein rotation of said plunger member is restricted.

32. The valve as described in claim 18 wherein the size of the throat in said nozzle member is determined from blowby data.

* * * * *